Figure 1:
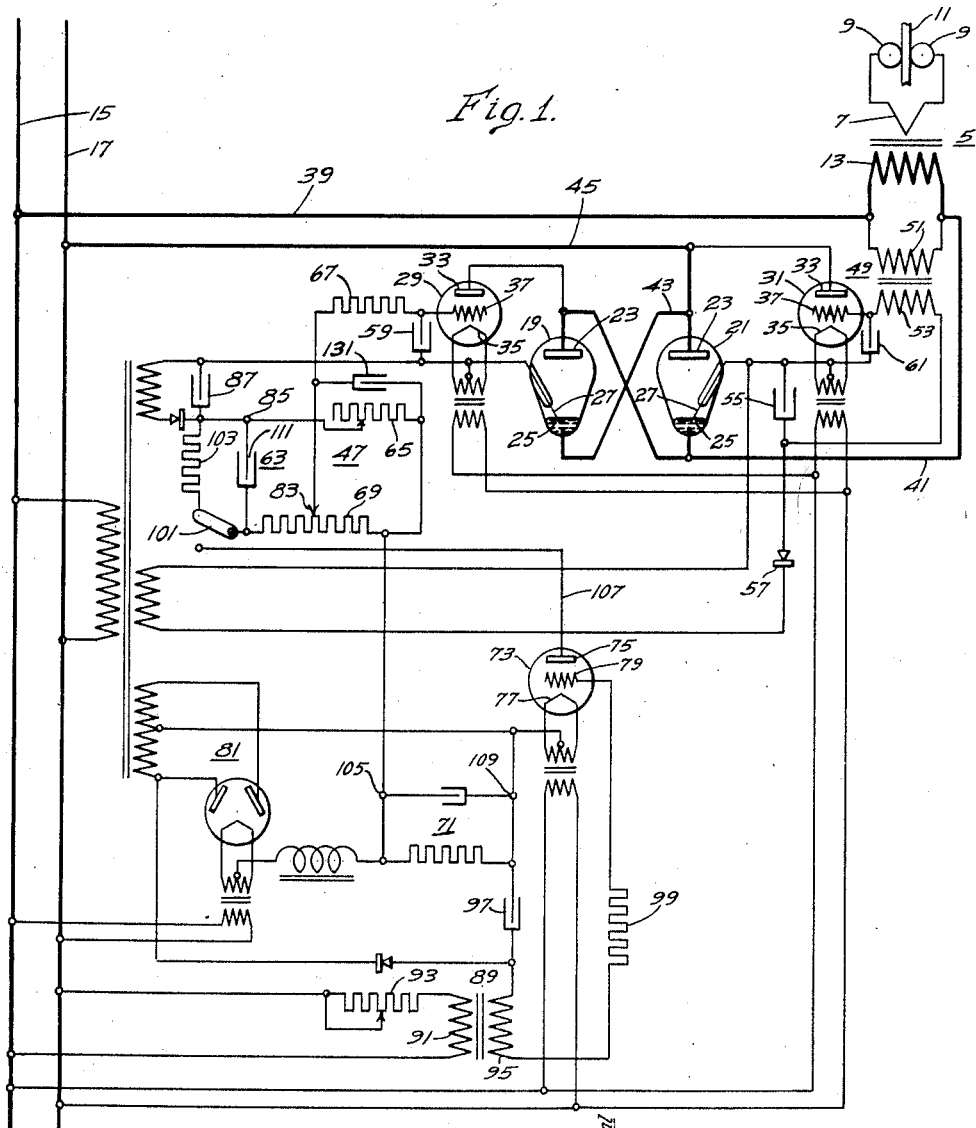

Nov. 25, 1941.                F. H. GULLIKSEN                2,263,773
                              SPOT WELDING TIMER
                            Filed July 28, 1938

WITNESSES:
C. J. Weller.
Hymen Diamond.

INVENTOR
Finn H. Gulliksen.
BY
F. W. Lyle.
ATTORNEY

Patented Nov. 25, 1941

2,263,773

UNITED STATES PATENT OFFICE 2,263,773

SPOT WELDING TIMER

Finn H. Gulliksen, Pittsburgh, Pa., assignor to Westinghouse Electric & Manufacturing Company, East Pittsburgh, Pa., a corporation of Pennsylvania Application July 28, 1938, Serial No. 221,858

10 Claims. (Cl. 250—27)

My invention relates to electric discharge apparatus and has particular relation to control systems for welding apparatus.

In resistance, spot and seam welding, the load current is supplied from an alternating current source and the time during which the current flows from the source is controlled by an electric discharge valve. A potential sufficient to render the valve conductive is impressed between the control electrode and the cathode thereof for the interval of time during which the welding current is to flow. At the end of this interval, the potential is decreased to a value below the critical control potential so that the device is rendered non-conductive. The control circuit for the discharge valve is normally such that the potential varies gradually from a value substantially greater than the critical potential to a value less than the critical potential and the interval of time during which the welding current flows is varied by changing the magnitude of the control potential initially impressed.

The inter-electrode capacity of the discharge valve, which is customarily used in resistance welding, is of substantial magnitude. To prevent the valve from being rendered conductive by line surges and similar phenomena and to otherwise compensate for the inter-electrode capacity, a condenser is connected between its control electrode and one of its principal electrodes. Further, to limit the flow of grid current in the valve, a resistor of substantial magnitude is connected to the control electrode. The timing control potential is impressed through the resistor and the condenser.

The network consisting of the resistor and condenser has an appreciable time constant and in view of this fact, an appreciable time is required for any potential impressed between the control electrode and one of the principal electrodes of the discharge device to take effect. Since the variation of a potential in a circuit having time constant is dependent on the initial potential impressed on the circuit, the time required for the control potential to take effect is different for different values of the initial control potential. Therefore, the time of flow of the welding current is varied in an undesired manner by reason of the fact that the resistor and condenser network is substantial.

It is accordingly an object of my invention to suppress the effect on the timing of the current limiting resistor and the compensating capacitor in the control circuit of the control valve in a welding system.

A more general object of my invention is to provide apparatus incorporating an electric discharge valve for controlling the flow of current from a source to a load that requires power in discrete pulses, in which the effect of the compensating and current limiting impedances in the control circuit of the discharge valve on the timing of the pulses shall be suppressed.

More concisely stated, it is an object of my invention to provide apparatus for precisely timing the flow of current from a source to a load requiring power in discrete impulses.

According to my invention, a capacitor is connected in the control circuit of the discharge valve to compensate for the influence of the time constant of the impedances in the control circuit. It is a well known fact that when a circuit is first closed through a capacitor, the initial effect is the same as if the capacitor plates had been short circuited. The capacitor used in the practice of my invention is so connected that by reason of this short circuiting effect, the initial potential impressed between the control electrode and the cathode of the discharge valve is the same regardless of the variations in the timing potential. The inaccuracy in the timing of the prior art apparatus arises from the difference in the delay of the response of the control circuit impedances for the different initial potentials impressed for the various timing settings. Since the capacitor functions to provide substantially the same potential, the timing apparatus according to my invention is rendered more accurate by the elimination of variations in the delay. To further suppress inaccuracies the initial potential impressed through the capacitor may be selected relatively high so that the delay is short.

Figure 2:
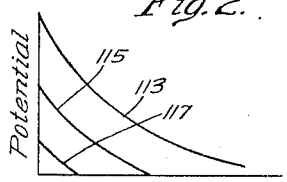
Figure 4:
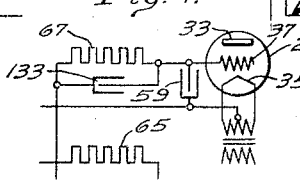
Figure 3:
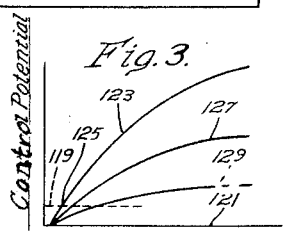

The novel features that I consider characteristic of my invention are set forth with particularity in the appended claims. The invention itself, however, both as to its organization and its method of operation, together with additional objects and advantages thereof will best be understood from the following description of specific embodiments when read in connection with the accompanying drawing, in which Figure 1 is a diagrammatic view showing an embodiment of my invention;

Figs. 2 and 3 are graphs illustrating the difficulties involved in prior art apparatus, and Fig. 4 is a diagrammatic view illustrating the essential features of a modification of my invention.

The apparatus shown in Figure 1 comprises a welding transformer 5 across the secondary 7 of which a pair of welding electrodes 9 are connected. The electrodes engage the material 11 to be welded and when the transformer 5 is energized, welding current flows through the electrodes 9 and the material. The primary 13 of the transformer is supplied from the line conductors 15 and 17 of a source (not shown) which may be of the commercial frequency type, through a pair of electric discharge valves 19 and 21 of the immersed-ignition electrode type connected in anti-parallel. Each valve comprises an anode 23 of nickel carbon or other material, a mercury pool cathode 25 and an ignition electrode 27 of boron carbide or other suitable material immersed in the mercury pool 25.

Current for rendering each of the discharge valves 19 and 21 conductive is supplied through auxiliary valves 29 and 31, which I shall designate as ignition valves. Each of the latter is of the arc-like type and comprises an anode 33, a hot cathode 35 and a control electrode 37. The ignition valve 29 for the left-hand main valve 19 is connected in a circuit which extends from the left-hand line conductor 15 through a conductor 39, the primary 13 of the welding transformer 5, a conductor 41, the anode 33 and cathode 35 of the ignition valve, the ignition electrode 27 and cathode 25 of the associated main valve, a conductor 43, a conductor 45 to the right-hand line conductor 17. The other ignition valve 31 is similarly connected to the line conductors 15 and 17 through the ignition electrode 27 and cathode 25 of the associated main valve 21.

The first mentioned ignition valve 29 is rendered conductive and maintained in conductive condition for a predetermined number of alternate half periods of the source by the operation of a timing system 47. By the operation of the timing system 47 a potential greater than the critical potential is impressed in the control circuit of the valve 29 and the valve is rendered conductive during the first half period during which positive anode-cathode potential is supplied thereto and during the number of positive half-periods thereafter determined by the setting of the timing system. When the valve 29 is rendered conductive, current flows through the above-traced circuit and thus through the ignition electrode 27 and cathode 25 of the associated main valve 19, and the latter is immediately rendered conductive and supplies current through the primary of the welding transformer 5.

To render the other ignition valve 31 conductive, control potential is supplied to it from an auxiliary transformer 49, the primary 51 of which is connected in parallel with the primary 13 of the welding transformer 5. The secondary 53 of the latter transformer is connected between the control electrode 37 and the cathode 35 of the ignition valve 31 through a suitable biasing potential provided by charging a biasing capacitor 55 through a rectifier 57 from the main supply 15—17. When current is supplied through the primary 13 of the welding transformer 5 after the first-mentioned main valve 19 is rendered conductive, a potential is impressed on the primary 51 of the control transformer. Since the load 7, 9, 11 is reactive, the conduction through the first main valve initiated during the corresponding positive half cycles of the source continues to a point displaced by a substantial angle from the point of zero potential in the subsequent negative half cycles. Therefore, just as the conduction through the first valve 19 ceases, positive anode-cathode potential is impressed on the other main valve 21 and on its associated ignition valve 31, and in addition, a positive potential of substantial magnitude is impressed in the control circuit of the latter valve. By the cooperative action of the positive anode-cathode potential and the control potential provided through the secondary of the control transformer, the ignition valve 31 is rendered conductive and supplies current through the ignition electrode of the associated main valve 21, rendering the latter conductive so that an impulse of current of opposite polarity to that supplied through the first main valve 19 is conducted through the welding transformer 5. It is seen that in accordance with the above-described operation, the timing system 47 controls only one of the ignition discharge valves 29 and its associated main valve 19. The other valves 31 and 21 are operated in response to current flow through the welding transformer 5.

Since each of the ignition discharge valves 29 and 31 has appreciable inter-electrode capacity between the control electrode 37 and the anode 33, surge potentials, which may arise in the source, would tend to raise the control electrode to the same potential as the anode. By reason of such potential distribution between the electrodes 37 and 33 of the valves 29 and 31, the valves could be rendered conductive at undesired times. To prevent accidental operation of this type, capacitors 59 and 61 are connected between the control electrodes 37 and the cathodes 35 of each of the ignition valves 29 and 31, respectively. Moreover, the timing during which welding current flows is measured out by charging a capacitor 63 through a rheostat 65 in the timing system 47. If substantial current were permitted to flow between the control electrode and the cathode of the ignition valve 29, the timing capacitor 63 would tend to discharge through the control circuit of the ignition valve 29, and, therefore, the timing would be materially varied. To eliminate this undesirable feature, a high resistor 67 is connected between the control electrode 37 of the ignition valve 29 and the timing system 47. No such resistor is necessary in the control circuit of the other ignition valve 31 since in this case no timing system, such as 47, is utilized.

The timing circuit 47 comprises, in addition to the timing capacitor 63 and the rheostat 65, a voltage divider 69 supplied from a direct current potential source 71 through an auxiliary discharge device valve 73 which I shall designate as a starting valve. The valve 73 is of the arc-like type and comprises an anode 75, a hot cathode 77 and a control electrode 79. The direct current potential may be derived from the main supply 15, 17 through a suitable full wave rectifier system 81. The adjustable tap 83 of the voltage divider 69 is connected to the control electrode 37 of the ignition valve 29 through the current limiting resistor 67. The timing capacitor 63 and the rheostat 65 through which it is charged are connected in series with each other across the terminals of the voltage divider 69. The junction point 85 of the timing capacitor 63 and the rheostat 65 is connected to the cathode 35 of the ignition valve 29 through a biasing capacitor 87.

Control potential is provided for the starting valve 73 through a saturable transformer 89.

The primary 91 of the transformer 89 is connected to the line conductors 15 and 17 through a rheostat 93. The secondary 95 of the transformer is connected between the control electrode 79 and the cathode 77 of the starting valve 73 through a biasing capacitor 97 and grid resistor 99.

Before the welding operation, the anode-cathode circuit of the starting valve 73 is open while its control circuit is closed when the main supply switch (not shown) is in closed position. Impulses of potential of short duration compared to a half period of the source are therefore, continuously supplied between the control electrode 79 and the cathode 77 of the starting valve. The potential impulses always occur at the same phase position relative to the half waves of the source, the phase being determined by the magnitude of the rheostat 93 in series with the primary 91 of the saturable transformer 89. The magnitude of the impulses supplied by the saturable transformer 89 is sufficient to render the starting valve 73 conductive provided anode-cathode potential is supplied thereto.

To start the welding operation, a circuit controller 101 which may be a manual switch, a push button or the like, is moved from a position in which it connects a short circuiting resistor 103 across the timing capacitor 63 to a position in which it connects the anode 75 of the starting valve 73 to the voltage divider 69, thus closing the circuit through the starting valve 73 and the voltage divider 69. Under such circumstances, current flows in a circuit extending from the positive terminal 105 of the direct potential source 71 through the voltage divider 69, a conductor 107, the anode 75 and cathode 77 of the starting valve 73 to the negative terminal 109 of the source. The current flow is initiated at an angle in the half cycle of the main supply 15, 17 which is predetermined by the occurrence of the peaked impulses in the control circuit of the starting valve 73 and, therefore, by the setting of the rheostat 93 in the primary circuit of the saturable transformer 89.

The current flow through the voltage divider 69 causes the timing capacitor 63 to begin to charge and at the same time impresses a potential in the control circuit of the ignition valve 29 which is sufficient to counteract the potential of the biasing capacitor 87. When the anode-cathode potential of the ignition valve 29 now becomes positive, the valve is rendered conductive causing the associated main valve 19 to be rendered conductive and current to flow for a half period through the welding transformer 5. As has been explained, the first half cycle of current is followed by another of opposite polarity through the other main valve 21 by reason of the operation of the control transformer 49 in parallel with the welding primary 13. The current flow continues until the timing capacitor 63 is sufficiently charged to balance out the effect of the potential impressed through the voltage divider 69.

To vary the time of welding current flow, the position of the adjustable tap 83 of the voltage divider 69 may be varied. By this means the initial potential impressed between the control electrode 37 and the cathode 35 of the ignition valve 29 is varied and thus the potential which is to be counteracted by charging the timing capacitor 63 is varied.

This is illustrated in Fig. 2. Here the potential impressed between the adjustable tap 83 of the voltage divider 69 and the upper plate 111 of the timing capacitor 63 is plotted as a function of time. In the graph shown the curves for three different timing intervals are plotted. For the purpose of facilitating the explanation, it is assumed that the interval during which welding current flows is terminated when the potential difference plotted as ordinate is equal to zero.

The upper curve 113 in Fig. 2 represents the condition existing where a large time interval is required. In such a case the height of the ordinate of the curve for zero abscissa shows that initial potential is relatively high. Where an intermediate time interval is required the central curve 115 shows that a moderate initial potential is involved and the lowest curve 117 shows a low initial potential for a short time interval.

The potential impressed from the timing system 47 takes effect through the compensating condenser 59 and the current limiting resistor 67 which are interposed between the circuit 47 and the control circuit of the ignition valve 29. The current limiting resistor 67 in cooperation with the condenser 59 constitutes a circuit having an appreciable time constant and, therefore, a substantial time elapses between the application of the potential through the timing circuit 47 and the energization of the ignition valve 29. If this delay were constant for the initial potentials corresponding to the different timing intervals, the delay introduced would be of minor consequence. However, this is not the case. The delay varies materially with the magnitude of the initial potential impressed.

In Fig. 3, this situation is illustrated graphically. Here the control potential of the ignition valve 29 is plotted as a function of time for the three different situations represented in Fig. 2. The broken line 119 parallel to the time axis 121 represents the critical potential of the ignition valve 29. The upper curve 123 represents the variation of the grid potential when the welding time interval is relatively long. In this case it is seen that by reason of the large initial potential impressed (curve 113, Fig. 2), the time delay in the energization of the ignition valve 29, as represented by the intersection 125 of the curve 123 and the broken line 119, is relatively short. A longer time delay is involved for the moderate welding time interval as shown by the course of the center curve 127, and a relatively long delay is involved for the short welding time interval as shown by the course of the lowest curve 129.

To eliminate the undesirable delay feature, a capacitor 131 is, in accordance with my invention, connected between the adjustable tap 83 of the voltage divider 69 and its positive terminal 105. When the manual switch 101 is first closed, the capacitor 131 functions as a short circuit and connects the positive terminal 105 of the direct current potential source 71 to the adjustable tap 83 of the voltage divider 69. Since the positive terminal 105 of the source is at the highest potential available, the capacitor 131 thus functions to impress the highest potential available in the control circuit of the ignition valve 29. The latter is, therefore, rendered conductive with the shortest possible delay. Once the valve 29 is rendered conductive, the influence of the capacitor 131 is of no further consequence. After the first energization of the valves 29 and 19, the timing potential takes effect only after a complete period of the main potential has elapsed, and at this time the capacitor 59 between the control electrode 37 and the cathode 35 of the ignition valve has been raised to a sufficient potential to maintain the ignition valve conductive. The capacitor 131 connected between the variable tap 83 and the positive terminal 105 of the voltage divider 69 thus functions to eliminate variations in timing.

The same effect may be produced by connecting a capacitor 133 across the current limiting resistor 67 as shown in Fig. 4. In this case, the current limiting resistor 67 is initially short circuited by the capacitor 133, and thus eliminated from the control circuit of the ignition valve 29. A cycle later, when the capacitor 133 may be charged, its function is no longer necessary for the operation of the equipment.

In an actual system in accordance with Fig. 1 which was constructed and operated successfully by me, the ignition device is a Westinghouse KU 676 thyratron capable of delivering approximately 10 amperes peak current, the capacitor between the control electrode and the cathode is .01 microfarad, the current limiting resistor is ½ megohm, the timing capacitor is 10 microfarads, the rheostat in series with the timing capacitors is 10,000 to 15,000 ohms, the voltage divider is 20,000 ohms, the direct current potential source supplied 400 volts, the starting device is a Westinghouse KU 627 thyratron capable of supplying two amperes peak current and the capacitor for suppressing the effect of the time constant is of the order of two microfarads.

In the Fig. 4 modification, the capacitor in parallel with the current limiting resistor should be of the same order of magnitude as the capacitor between the control electrode 37 and the cathode 35, and therefore, in the illustration just discussed, is .01 microfarad.

I have discussed above briefly the theory of operation of apparatus constructed according to my invention. It is understood that I do not intend in any way to be bound by this explanation of the theory of operation.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. For use in supplying a load that requires precisely timed discrete impulses of current from a source the combination comprising an electric discharge device having a control electrode and a plurality of principal electrodes for controlling the supply of current from said source to said load, means for timing the flow of load current including a pair of terminals connected to said control electrode and one of said principal electrodes between which a potential, which varies in accordance with the desired timing, is impressed, resistance and capacitative means connected to said control electrode and said one principal electrode, said potential being impressed between said control electrode and said one principal electrode through said resistance and capacitative means and means for suppressing the effect of the time constant of said resistance and capacitative means on the timing of the load current.

2. In combination, an electric discharge device having a control electrode and a plurality of principal electrodes, a source of potential, resistance and capacitative means interposed between said source and said control electrode and one of said principal electrodes, means for supplying a varying potential from said source between said control electrode and said one principal electrode and means for suppressing the effect of the time constant of said resistance and capacitative means in causing the instant of response of said device to change as said potential varies.

3. Apparatus according to claim 2, characterized by the fact that the supplying means includes a voltage divider, the adjustable tap of which is connected to the resistance and capacitative means and the suppressing means includes a capacitor connected between said adjustable tap and one terminal of the source.

4. Apparatus according to claim 2 characterized by the fact that the suppressing means includes a capacitor connected in parallel with the resistance means.

5. Apparatus for supplying current from a source to a load comprising an electric discharge device having a control electrode and a plurality of principal electrodes for controlling the flow of current from said source, means for timing the flow of current including a pair of terminals connected to said control electrode and one of said principal electrodes between which a potential, the magnitude of which varies in accordance with the desired timing, is impressed, a resistor and a capacitor connected to said control electrode, said potential being impressed between said control electrode and said one principal electrode through the said resistor and capacitor, and means for suppressing the effect of the time constant of said resistor and capacitor on the timing of the current flow.

6. Apparatus for supplying current from a source to a load comprising an electric discharge device having a control electrode and a plurality of principal electrodes for controlling the flow of current from said source, means for timing the flow of current including a pair of terminals connected to said control electrode and one of said principal electrodes between which a potential, the magnitude of which varies in accordance with the desired timing, is impressed, a resistor and a capacitor connected to said control electrode, said potential being impressed between said control electrode and said one principal electrode through the said resistor and capacitor, and means for suppressing the effect of the time constant of said resistor and capacitor on the timing of the current flow, said suppressing means including means coupled to said terminals providing for the supply of substantially the same initial potential therebetween for different timing intervals.

7. Apparatus for supplying current from a source to a load comprising an electric discharge device having a control electrode and a plurality of principal electrodes for controlling the flow of current from said source, means for timing the flow of current including a pair of terminals connected to said control electrode and one of said principal electrodes between which a potential, the magnitude of which varies in accordance with the desired timing is impressed, a resistor and a capacitor connected to said control electrode, said potential being impressed between said control electrode and said one principal electrode through the said resistor and capacitor, and means for suppressing the effect of the time constant of said resistor and capacitor on the timing of the current flow, said suppressing means including a capacitor for initially maintaining said terminals at the same potential difference.

8. Apparatus for supplying current from a source to a load comprising an electric discharge device having a control electrode and a plurality of principal electrodes for controlling the flow of load current from said source, means for timing the flow of load current including a pair of terminals connected to said control electrode and one of said principal electrodes between which a potential, the magnitude of which varies in accordance with the desired timing, is impressed, a resistor and a capacitor connected to said control electrode, said potential being impressed between said control electrode and said one principal electrode through the said resistor and capacitor, and means for suppressing the effect of the time constant of said resistor and capacitor on the timing of the load current flow, said suppressing means including a capacitor connected in parallel with said resistor.

9. Apparatus for supplying current from a source to a load comprising an electric discharge device having a control electrode and a plurality of principal electrodes for controlling the flow of load current from said source, means for timing the flow of load current including a pair of terminals connected to said control electrode and one of said principal electrodes between which a potential, the magnitude of which varies in accordance with the desired timing, is impressed, one of said terminals being the adjustable tap of a voltage divider supplied from a direct current source, resistance and capacitative means interconnecting the said terminals and also said control electrode and said one principal electrode, and means for suppressing the effect of the time constant of said resistance and capacitative means on the timing of the current flow, said suppressing means including a capacitor connected between said adjustable tap and one of the terminals of said direct current source.

10. Apparatus for supplying current from a source to a load comprising an electric discharge device having a control electrode and a plurality of principal electrodes for controlling the flow of load current from said source, means for timing the flow of load current including a pair of terminals connected to said control electrode and one of said principal electrodes between which a potential, the magnitude of which varies in accordance with the desired timing, is impressed, one of said terminals being the adjustable tap of a voltage divider supplied from a direct current source, resistance and capacitative means interconnecting the said terminals and also said control electrode and said one principal electrode, said adjustable tap being connected to said control electrode through said resistance means, and means for suppressing the effect of the time constant of said resistance and capacitative means on the timing of the load current flow, said suppressing means including a capacitor connected between said adjustable tap and the positive terminal of said direct current source.

FINN H. GULLIKSEN.